US009920690B2

(12) United States Patent
Cohin et al.

(10) Patent No.: US 9,920,690 B2
(45) Date of Patent: Mar. 20, 2018

(54) AIR SUPPLY DEVICE FOR AIRCRAFT ENGINE TURBINES

(71) Applicant: SNECMA, Paris (FR)

(72) Inventors: Arthur Lou Nicolas Cohin, Honfleur (FR); Audrey Charrie, Nandy (FR); Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 326 days.

(21) Appl. No.: 14/425,534

(22) PCT Filed: Sep. 3, 2013

(86) PCT No.: PCT/FR2013/052028
§ 371 (c)(1),
(2) Date: Mar. 3, 2015

(87) PCT Pub. No.: WO2014/037664
PCT Pub. Date: Mar. 13, 2014

(65) Prior Publication Data
US 2015/0226121 A1 Aug. 13, 2015

(30) Foreign Application Priority Data
Sep. 4, 2012 (FR) .................................... 12 58235

(51) Int. Cl.
*F02C 7/04* (2006.01)
*F02C 7/20* (2006.01)
(Continued)

(52) U.S. Cl.
CPC .............. *F02C 7/04* (2013.01); *F01D 9/065* (2013.01); *F01D 11/001* (2013.01); *F02C 7/12* (2013.01);
(Continued)

(58) Field of Classification Search
CPC ........ F01D 11/005; F01D 9/065; F01D 9/023; F01D 25/08; F01D 25/12; F01D 25/24; F01D 5/082; F05D 2260/31; F02C 7/20
See application file for complete search history.

(56) References Cited

U.S. PATENT DOCUMENTS

| 7,025,562 B2 * | 4/2006 | Imbourg | F01D 5/082 415/115 |
| 7,086,830 B2 * | 8/2006 | Fitzgerald | F01D 5/082 415/115 |
| 2011/0206504 A1 * | 8/2011 | Blanchard | F01D 5/081 415/199.1 |

FOREIGN PATENT DOCUMENTS

| EP | 1 450 005 A1 | 8/2004 |
| EP | 1 785 588 A1 | 5/2007 |
| EP | 2 011 966 A2 | 1/2009 |

OTHER PUBLICATIONS

International Search Report as issued in International Patent Application No. PCT/FR2013/052028, dated Feb. 3, 2014.

* cited by examiner

Primary Examiner — Woody Lee, Jr.
Assistant Examiner — Elton Wong
(74) Attorney, Agent, or Firm — Pillsbury Winthrop Shaw Pittman LLP

(57) ABSTRACT

An air supply device for an aircraft engine turbine, in which device the air is conveyed to at least one aircraft engine turbine after being conveyed through at least one connecting sleeve from a low pressure distributor to a space defined by at least one upstream side and one downstream side, the upstream side having at least one opening and each pierced opening receiving one end of one of the connecting sleeves, wherein the upstream side and the downstream side are secured by at least one fastener. A retaining plate is used for each fastener in order to position a securing element of the (Continued)

fastener, the retaining plate having a supporting surface that blocks each connecting sleeve axially in one direction.

14 Claims, 2 Drawing Sheets

(51) Int. Cl.
 *F02C 7/12* (2006.01)
 *F01D 9/06* (2006.01)
 *F01D 11/00* (2006.01)
(52) U.S. Cl.
 CPC ............ *F02C 7/20* (2013.01); *F05D 2260/31* (2013.01); *Y02T 50/671* (2013.01)

AIR SUPPLY DEVICE FOR AIRCRAFT ENGINE TURBINES

CROSS REFERENCE TO RELATED APPLICATIONS

This application is the U.S. National Stage of PCT/FR2013/052028, filed Sep. 3, 2013, which in turn claims priority to French Patent Application No. 1258235 filed Sep. 4, 2012, the entire contents of all applications are incorporated herein by reference in their entireties.

TECHNICAL FIELD OF THE INVENTION

The present invention relates to an air supply device for engine turbines—or turboreactors or instead turbomachines—of aircraft.

The technical field of the invention is, generally speaking, that of aircraft engines, and more particularly that of the circulation of air and/or the cooling of different elements, especially the circulation of air between a low pressure distributor and low pressure turbines and high pressure turbines of the engines in question.

TECHNOLOGICAL BACKGROUND OF THE INVENTION

In aircraft engines, low pressure distributors have especially the function of making air circulate to the low and high pressure turbines. To this end, air is transmitted via sleeves from the low pressure distributors to cavities defined by side plate type elements which supply the low and high pressure turbines with air. The supply of the turbines through the sides is, generally speaking, realised via injectors of which the number, the positioning and the sections are determined as a function of the characteristics of the turbines in question.

A particular zone of an example of such an air supply device is represented, in cross-section and schematically, in FIG. 1. In this figure, the end of a sleeve 101 is represented, forming a connecting tube, through which is transmitted air from a low pressure distributor, not represented; the air is thus transmitted into a space 102 defined by a downstream side 104 and an upstream side 103, in which is cut a pierced opening receiving one end of the sleeve 101. In the example represented, the upstream side 103 and the downstream side 104 are secured by means of a first screw-nut system comprising a first screw 105 maintained in a first nut 106 positioned on the upstream side 104.

In order to maintain the sleeve 101 in position, it is necessary to block it at its lower end by a retention plate 109, the upper end, not represented, being blocked by the low pressure distributor itself.

The retention plate 109 is maintained in position by a second screw-nut system comprising a second screw 107 and a second nut 108 on one side of the upstream side 103. One end of the retention plate 109 extends to the level of the pierced opening receiving the sleeve 101 so as to maintain said sleeve 101 blocked.

Such an arrangement is repeated a number of times corresponding to the number of sleeves present under the low pressure distributor. The sleeves are arranged in a plane perpendicular to the plane of the cross-section visible in FIG. 1, and are organised circularly around a space defined by the upstream and downstream sides.

A drawback of devices of the prior art of the type of those that have just been described resides in the considerable number of securing parts that need to be present; indeed, it is necessary to provide for a specific securing system dedicated to maintaining the retention plate used to block a specific sleeve axially. Since the number of sleeves present for transmitting air from the low pressure distributors is typically several tens, this results in a cost drawback—due to the considerable number of parts intervening for securing said sleeves—as well as a multiplication of mounting operations, the retention plate having to be fixed at the level of each sleeve.

GENERAL DESCRIPTION OF THE INVENTION

The subject matter of the invention offers a solution to the problem that has just been described, by proposing an air supply device for aircraft engine turbines in which one limits the number of securing means intervening to assure the securement of different sides present and to assure the retention of the sleeves transmitting air from the low pressure distributors.

To this end, the invention provides for the use of a particular part assuring simultaneously on the one hand the retaining in position of crimping nuts intervening in the securement of the upstream and downstream sides, and on the other hand the blocking of the sleeves assuring the transfer of air from the low pressure distributor to an inner space defined by the upstream and downstream sides.

The invention thus essentially relates to an air supply device for an aircraft engine turbine, in which device the air is conveyed to at least one aircraft engine turbine after being conveyed through at least one connecting sleeve from a low pressure distributor to a space defined by at least one upstream side and one downstream side, the upstream side having at least one opening, each pierced opening receiving one end of one of the connecting sleeves, characterised in that the upstream side and the downstream side are secured by at least one securing means, a retaining plate assuring the positioning, for each securing means, of a securing element of the securing means in question, said retaining plate having a supporting surface that blocks each connecting sleeve axially in one direction.

Apart from the main characteristics that have been mentioned in the preceding paragraph, the air circulation device according to the invention may have one or more complementary characteristics among the following, considered individually or according to any technically possible combinations thereof:

the securing element is a nut crimped onto the retaining plate;

the supporting surface rotationally blocks the crimped nut on the retaining plate;

the supporting surface is constituted of a succession of supporting zones, the supporting zones intervening in the rotational blocking of one of the crimped nuts having a depth greater than the supporting zones intervening uniquely for the blockage of the connecting sleeves;

the supporting surface of the retaining plate blocks each connecting sleeve axially, in one direction, at the level of one end of said supporting surface, said end leaving open the connecting sleeve in question;

the supporting surface is scalloped;

the supporting surface is contained within a plane perpendicular to a retaining surface of the crimped nuts;

the retaining surface of the crimped nuts is scalloped;

the retaining plate comprises pierced openings able to receive means of securing said retaining plate on the upstream side;

the retaining plate retains a predetermined number of sleeves, and the retaining plate is used for the positioning of a predetermined number of securing elements, the ratio between the number of sleeves and the number of securing elements being a whole number, typically three;

The present invention also relates to a retaining plate able to be used in the device according to the invention.

The present invention further relates to an aircraft comprising the air circulation device according to the invention.

The invention and the different applications thereof will be better understood on reading the description that follows and by examining the figures that accompany it.

BRIEF DESCRIPTION OF THE FIGURES

The figures are only presented for indicative purposes and in no way limit the invention.

The figures show.

DETAILED DESCRIPTION OF AT LEAST ONE EMBODIMENT OF THE INVENTION

Unless stated otherwise, a same element appearing in the different figures conserves the same reference. The expressions used to determine the positioning of certain elements must be understood as references to positionings when the elements are positioned in normal conditions of use.

Figure 1:
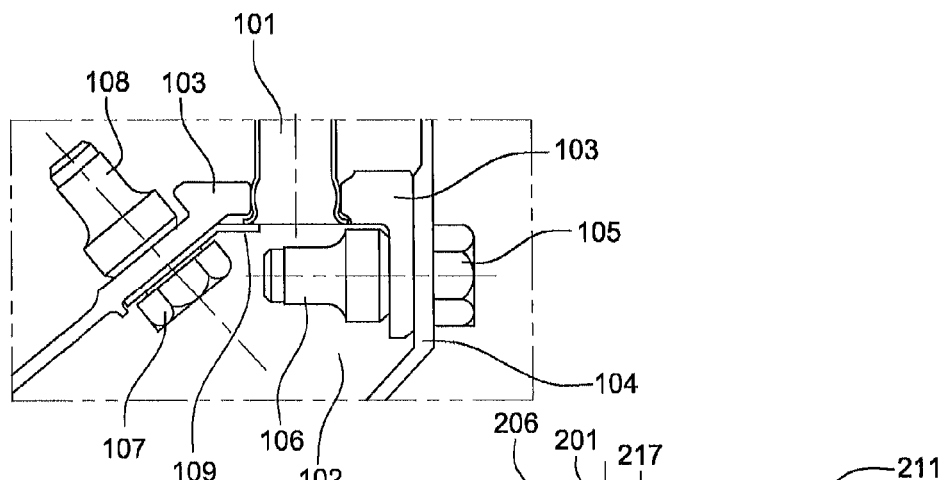
in FIG. 1, a schematic representation of a particular zone of an example of air circulation device under a low pressure distributor existing in the prior art.
Figure 2:
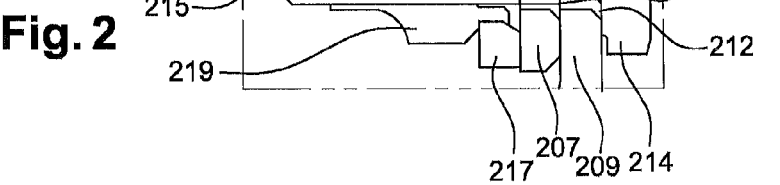
in FIG. 2, a schematic representation of an example according to the invention of air circulation device under a low pressure distributor.
Figure 3:
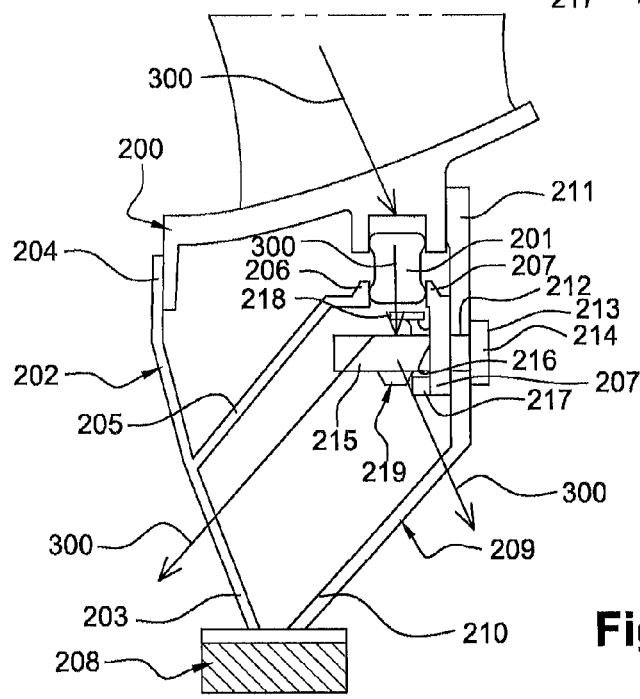
in FIG. 3, a detailed representation of a particular zone of the device of FIG. 2.
Figure 4A:
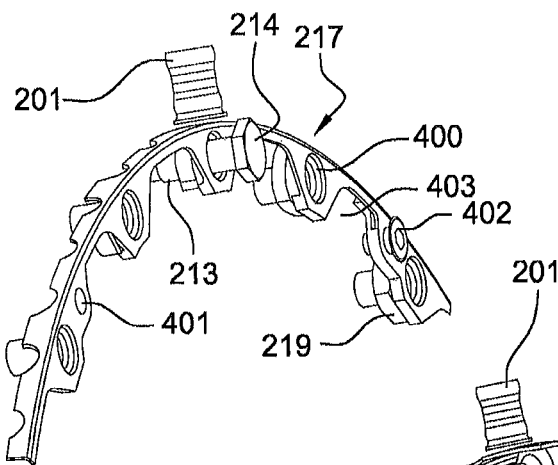
in FIGS. 4-A, 4-B, 4-C and 4-D, different views of a retaining plate used in the air circulation device according to the invention.
Figure 4B:
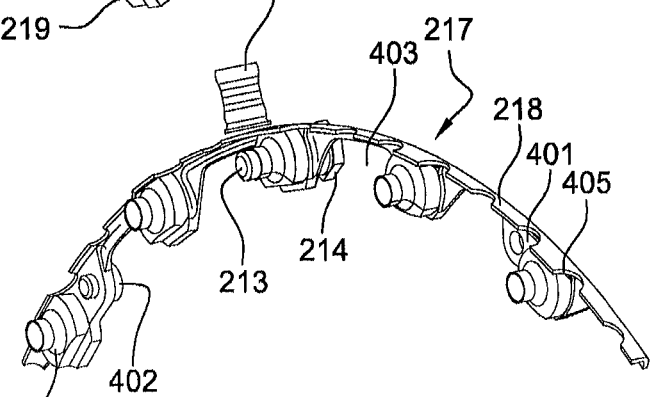
Figure 4C:
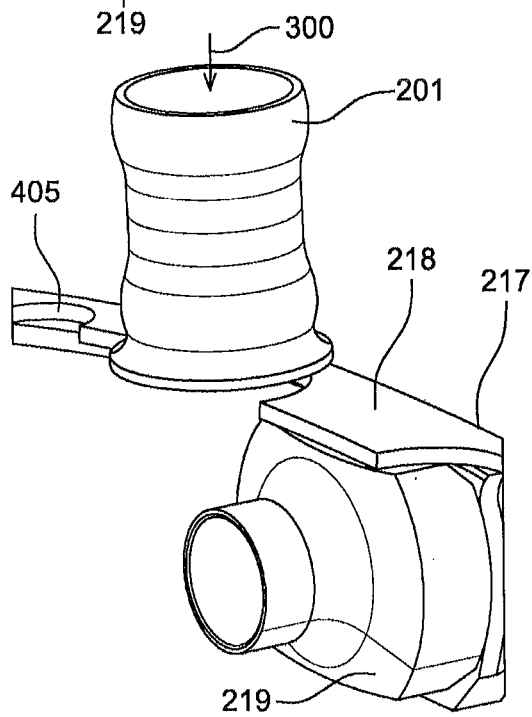
Figure 4D:
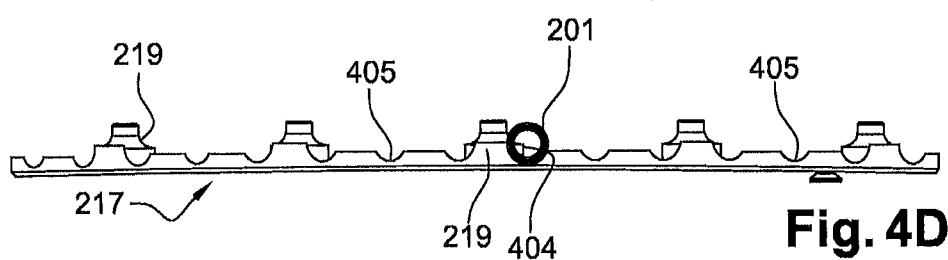

In FIG. 2 is represented a view in section of an example of air circulation device according to the invention. FIG. 2 is described jointly with FIG. 3, which shows in a more detailed manner a particular zone of the example of device represented in FIG. 2, said particular zone containing especially a retaining plate 217 constituting an essential element of the device according to the invention.

In FIG. 2 is represented a direction of circulation of air 300 in one example of air supply device according to the invention. In this figure, it may be seen that the air passes through a low pressure distributor 200 to be transmitted, via a connecting sleeve 201, into a space defined by an upstream side 202 and by a downstream side 209 to then be conveyed, via injectors not represented, to the low and high pressure turbines. The upstream side 202 has, in section, an overall "Y" shape, with a lower end 203 used for the positioning of an abradable element 208, a first upper end 204 positioned against a wall of the low pressure distributor 200, and a second upper end 206 terminating a wall 205. The abradable 208 here has the function of assuring the separation between the high pressure cavities and the low pressure cavities. The second upper end 206 has an opening in which is inserted a lower end of the sleeve 201; the upper end 206 ends in a portion 207 forming a return substantially vertical at the level of which the upstream side 202 is secured with the downstream side 209.

The downstream side 209 has especially one upper end 211 positioned against a wall of the low pressure distributor 200, and a lower end 210 contributing to the positioning of the abradable element 208. The downstream side 209 further comprises a pierced opening 212, positioned opposite a pierced opening 216 cut in the portion 207 of the upstream side 202, the pierced opening 212 and the pierced opening 216 being intended to receive a securing element of screw type 214, which forms with a nut 219 an example of securing means assuring the securement between the upstream side 202 and the downstream side 209.

According to the invention, the retaining plate 217 assures the positioning of the nut 219, for example by presenting it in a crimped manner on said plate 217. Thus, once the upstream side 202, the downstream side 209 and the retaining plate 217 are positioned, a rod 215 of the screw 214 may be inserted easily into the nut 219, a screw head 213 of the screw 214 being retained, at the end of the screwing operation, against an outside wall of the downstream side 209.

According to the invention, the retaining plate 217 has a supporting surface 218 which assures the axial blocking of the sleeve 201, at the level of its lower end, towards the inside of the space defined by the upstream side 202 and the downstream side 209. Axial blockage designates blockage in the direction of the circulation of air through the sleeve 201 of overall cylindrical shape. The upper end of the connecting sleeve 201 is blocked against a wall of the low pressure distributor 200, assuring its axial retaining in the direction opposite to the blocking assured by the retaining plate 217.

FIGS. 4-A, 4-B, 4-C and 4-D show the retaining plate 217 respectively according to a first perspective view, according to a second perspective view, according to a more detailed partial view and according to a top view.

The retaining plate 217 assures the retaining of a plurality of connecting sleeves 201, a single sleeve 201 being represented in the figures in the interests of clarity; as described previously, the lower end of each sleeve 201 is blocked by the supporting surface 218, at the level of a supporting point 404 which makes it possible to block the sleeve 201 axially without obstructing it, the circulation of air thus not being hindered. In order to assure the securement of the upstream side 202 and of the downstream side 209, the retaining plate 217 has a plurality of pierced openings 400 intended to allow each screw 214 to be introduced into each crimped nut 219. The pierced openings 400 are arranged in a same plane constituting a surface for retaining, positioning, crimped nuts 219. The retaining surface of the nuts is scalloped, such that two successive zones having a pierced opening, and thus forming a support for a crimped nut, are spaced with empty portions 403, making the retaining plate 217 lighter.

Advantageously, the supporting surface 218 is scalloped, in order to lighten the retaining plate 217. The supporting surface thus has a succession of supporting zones, spaced apart by empty portions 405, said supporting zones forming teeth extending in one direction substantially perpendicular to the plane constituting the retaining surface of the crimped nuts 219, said supporting zones having a greater depth when they are used to assure the rotational blocking of the crimped nuts 219 during operations of screwing down the screws 214 than when they are used simply for the axial blocking of the sleeves 201.

Advantageously, it is provided that a plurality of sleeves 201 are maintained by a sector of the supporting surface 218 comprised between two consecutive nuts 219; in the example represented, it is thus provided that three sleeves 201 are retained by each sector of the retaining plate 217 comprised between two consecutive nuts 219.

In the examples represented, the realisation of pierced openings 401 that are able to receive fastening screws, or slugs, 402 in order to secure the retaining plate 217 on the upstream side 202 is provided; such a securement makes it possible to facilitate the putting in place of the different elements for the securement of the upstream side 202, equipped with the retaining plate 217, and of the downstream side 209.

The retaining plate 217 is advantageously sectored: it is necessary to juxtapose several of them—typically three or four—to form a complete turn assuring the securement of the upstream side 202 and of the downstream side 209.

The invention claimed is:

1. An air supply device for an aircraft engine turbine, comprising:
    at least one connecting sleeve;
    at least one upstream side and one downstream side, wherein air is conveyed to at least one aircraft engine turbine after being conveyed through the at least one connecting sleeve from a low pressure distributor to a space defined by the at least one upstream side and the one downstream side, said upstream side having at least one opening receiving one end of the connecting sleeve,
    wherein the upstream side and the downstream side are secured by at least one fastener, a retaining plate is used, to position a securing element of the at least one fastener, said retaining plate having a supporting surface that blocks each of the at least one connecting sleeve axially, with respect to the direction of air circulation through the at least one connecting sleeve, in one direction, said retaining plate being attached to the upstream side and the downstream side with the at least one fastener, wherein said air supply device further comprises at least one other fastener configured to only secure the retaining plate to the upstream side.

2. The air supply device for an aircraft engine turbine according to claim 1, wherein the securing element is a nut crimped onto the retaining plate.

3. The air supply device for an aircraft engine turbine according to claim 2, wherein the supporting surface rotationally blocks the nut crimped onto the retaining plate.

4. The air supply device for an aircraft engine turbine according to claim 3, wherein the supporting surface is constituted of a succession of supporting zones.

5. The air supply device for an aircraft engine turbine according to claim 2, wherein the supporting surface is contained within a plane perpendicular to a retaining surface of the crimped nut.

6. The air supply device for an aircraft engine turbine according to claim 5, wherein the retaining surface of the crimped nut is scalloped.

7. The air supply device for an aircraft engine turbine according to claim 1, wherein the supporting surface of the retaining plate axially blocks, in one direction, each of the at least one connecting sleeve at the level of one end of said supporting surface, said end leaving open the connecting sleeve.

8. The air supply device for an aircraft engine turbine according to claim 1, wherein the supporting surface is scalloped.

9. The air supply device for an aircraft engine turbine according to claim 1, wherein the retaining plate comprises at least one pierced opening able to receive the at least one other fastener to secure said retaining plate on the upstream side.

10. An aircraft comprising an air supply device for an aircraft engine turbine according to claim 1.

11. The air supply device for an aircraft engine turbine according to claim 1, wherein the at least one fastener comprises a screw.

12. The air supply device for an aircraft engine turbine according to claim 1, wherein the supporting surface of the retaining plate is in contact with the at least one connecting sleeve to axially block, in one direction, the at least one connecting sleeve at the level of one end of said supporting surface, said end leaving open the at least one connecting sleeve.

13. The air supply device for an aircraft engine turbine according to claim 1, wherein the retaining plate is attached to the upstream side and the downstream side so that part of the upstream side is secured between the retaining plate and the downstream side with the at least one fastener.

14. The air supply device for an aircraft engine turbine according to claim 1, wherein the at least one other fastener comprises a screw or a slug.

* * * * *